Aug. 11, 1970     B. D. BLAKKAN     3,524,066
FLUID MEASUREMENT SYSTEM HAVING SAMPLE CHAMBER WITH OPPOSED
REFLECTING MEMBERS FOR CAUSING MULTIPLE REFLECTIONS
Filed Aug. 22, 1966     4 Sheets-Sheet 1

INVENTOR
BRUCE D. BLAKKAN

BY *Robert J. Schaap*

ATTORNEY

INVENTOR
BRUCE D. BLAKKAN
BY *Robert J. Schaap*
ATTORNEY

FIG. 13

INVENTOR
BRUCE D. BLAKKAN

United States Patent Office 3,524,066
Patented Aug. 11, 1970

3,524,066
FLUID MEASUREMENT SYSTEM HAVING SAMPLE CHAMBER WITH OPPOSED REFLECTING MEMBERS FOR CAUSING MULTIPLE REFLECTIONS
Bruce D. Blakkan, Ferguson, Mo., assignor to Monsanto Company, St. Louis, Mo., a corporation of Delaware
Filed Aug. 22, 1966, Ser. No. 574,136
Int. Cl. G01n 21/24
U.S. Cl. 250—218                3 Claims

ABSTRACT OF THE DISCLOSURE

A method and apparatus for measuring the amount of a substance present in a fluid. The method and the apparatus employ semiconductor light source, preferably in the form of a laser, which emits a spectral distribution having an emissivity compatible with the principal absorption band of the substance in the fluid. Process control can also be provided by using this system.

---

This invention relates in general to certain new and useful improvements in fluid measurement systems and more particularly, to the use of light emitting semiconductor devices for detecting the presence of and for measuring the amount of a gas or liquid in a medium.

There are a number of commercially available methods for detecting the presence of a gas or a liquid in a selected medium. One of the commonly employed methods resides in the use of the gas chromatograph where the gas is injected into a column and the time for the constituents to move down the column is calculated. The particular gas is, therefore, a function of the rate of time required for the constituent to move down the column and is also dependent upon the size of the column.

Another effective method used in detection of gases or liquids in a particular medium employs the flame photometer where a flame is used to excite the material. Thereafter, the spectrum of light output obtained is examined with the use of a spectrophotometer. Still another effective method resides in the use of the absorption spectrophotometer which passes white light through a prism or monochromator. The amount of light at various wavelengths which are transmitted through the gas or liquid are determined and the amount of light which passes through is directly related to the presence or lack of the gas or liquid in the particular media.

Another widely used method of detecting the presence of an unknown gas or liquid resides in the use of the mass-spectrometer where ionized gas is accelerated through a velocity trap. The rate of acceleration is recorded and compared to predetermined standards. This system operates on the principle that different gases have different masses and different ionization levels, and therefore, will accelerate differently through the mass-spectrometer.

It is often desirable to be able to detect the presence of a gas in any particular medium, particularly in laboratory work. This is also desirable from a safety standpoint where, for example, it may be desired to determine the amount of carbon monoxide present in an automotive garage. Detections of the presence and the amount of a particular constituent in a media is also desirable from a control standpoint, such as in process control instrumentation. However, each of the commercially available methods and the devices performing these methods heretofore available were not entirely satisfactory. For the most part, each of the aforementioned methods is very time consuming and requires a great deal of manpower to accurately determine the results. Furthermore, the equipment employed for the performance of these tests is quite costly and the operators of the equipment must be trained with a high degree of skill in order to perform examinations with any degree of accuracy. In addition to these facts, these devices heretofore mentioned were not readily transportable, and could not be easily moved to a desired location for performing a test. Hence, it was necessary to extract a sample and bring the sample to a laboratory where the equipment was stationed.

OBJECTS

It is, therefore, the primary object of the present invention to provide a fluid measurement system which requires no moving parts and employs solid state circuitry.

It is another object of the present invention to provide a fluid measurement system of the type stated which is capable of detecting the presence of or measuring the amount of gas or liquid present in a selected media.

It is a further object of the present invention to provide a fluid measurement apparatus of the type stated which has a high degree of reliability and can be operated with a minimum amount of skill and training.

It is an additional object of the present invention to provide a fluid measurement system of the type stated which is capable of performing continuous sampling and continuous monitoring in process control systems.

It is another salient object of the present invention to provide a fluid measurement system of the type stated which can be built into a relatively small compact unit and is easily transportable for making rapid measurement and detection analysis.

With the above and other objects in view, my invention resides in the novel features of form, construction, arrangement and combination of parts presently described and pointed out in the claims.

GENERAL DESCRIPTION

Generally speaking, the present invention relates to a method and an apparatus for detecting the presence of a known gas or liquid in a selected medium. The present invention is also applicable to the measurement of the amount of gas or liquid present in the medium when the presence has been detected or is known. The system employs a laser which is preferably an injection laser diode such as a gallium arsenide or a gallium arsenide phosphide diode and is normally retained in a cryogenic medium for maintaining proper temperature control of the diode. The cryogenic medium is conventional and a liquid nitrogen bath is one suitable form thereof. The laser diode is connected to a laser power supply, preferably a D.C. voltage source, if a continuously working laser operating at the desired wave length is available. It may also be desirable to employ a pulsing mechanism for providing pulsed D.C. current to the laser so that the laser radiation may be in the form of laser pulses with quiescent periods between each pulse. The laser beam is then passed through a lens which is desirable in some, but not all applications and is designed to focus the laser beam prior to entry into a sample cell. The laser beam is then passed through a sample cell which contains the sample to be tested. The sample cell may be designed so that it contains a selected quantity of the medium which is to be analyzed for the presence of a gas or liquid. It may also be a continuous flow system where the gas or liquid to be detected may be present in a stream which is passing through the sample cell.

The sample cell is preferably a long tube which contains the liquid or gas and contains a pair of optical flats on each of the ends which are transverse to the direction of the laser beam. In this manner, the sample cell will not interfere with the passage of the laser beam. A modified form of sample cell is also provided. This modified form of sample cell includes a pair of optical flats on each of the transverse ends. However, a portion of the interior surface of the optical flats is provided with reflecting surfaces so that the laser beam is subjected to a series of multiple reflections internally in the sample cell. In this manner, it is thereby possible to increase the effective length traversed by the laser beam.

The portion of the laser beam which has not been absorbed in the sample cell will next pass through an optical filter which is probably of neutral density and is preferably in some applications. The radiation is then transmitted to a radiation detector which determines the amount of laser radiation absorbed in the sample cell. The signal from the radiation detector is then transmitted electrically to an electronic detector for electronically measuring the amount of radiation which has been absorbed. Thereafter, a signal from the electronic detector can be optionally transmitted to a display device or recorder or some conventional readout device.

It has also been found in connection with the present invention that incoherent monochromatic light may also be employed. While injection laser diodes have been found to be most effective, other semi-conductor laser sources have also proved to be effective. For example, the electronic bombardment and optical pumping of semi-conductor masses has been found to produce suitable coherent monochromatic light sources. The necessary criteria in connection with the present invention is that the light source must be produced by a semi-conductor device.

Semi-conductor light emission has been found to be far suitable to other types of light radiation for the purposes of the present invention. Semi-conductor light has the unique property that it ca nbe rapidly modulated. If semi-conductor light were not employed, it might be necessary to either use a D.C. or A.C. power source. If a D.C. source were employed, then many ambient light conditions would affect the readout of the device. This creates conditions where light-proof boxes and other apparatus must necessarily be employed. Even in this light-proof apparatus, it is often times difficult to maintain light-tight conditions so that ambient light does not interfere with the normal operation of the device. Furthermore, it would also be necessary to use a type of light chopper in order to provide light interruption. Additionally, if A.C. or D.C. power were employed, it would not be possible to obtain the controlled spectral distribution that is obtained in connection with semi-conductor light sources.

The above system is easily adaptable to process control loops where it is desired to detect the amount of or the presence of a particular constituent in a moving fluid. In this case, the radiation detector and the laser generator would be placed on opposite sides of a tube in a process loop where the tube serves as the sample cell. A control signal from the radiation detector can then be transmitted to a suitable control device for controlling the input or output of the system pursuant to the amount of gas or liquid detected in the fluid passing through the sample cell.

The apparatus of the present invention is also adaptable for operation as a colorimeter. In this embodiment, a spindle is rotatable through a series of arcs for preselected distance. The spindle carries a plurality of circumferentially spaced sample tubes which are automatically alignable with a light emitting source and a detector. This structure provides for easy interchangeability of sample tubes. The sample tubes are consecutively rotated into alignment with the source and the detector. The spindle may be rotatable by manual actuation for each position or it may be continuously rotatable with intermittent stops between each of the sample tubes. This apparatus may also be provided with a suitable readout panel for indicating the quantity of a test material in a medium.

DETAILED DESCRIPTION

Figure 1:
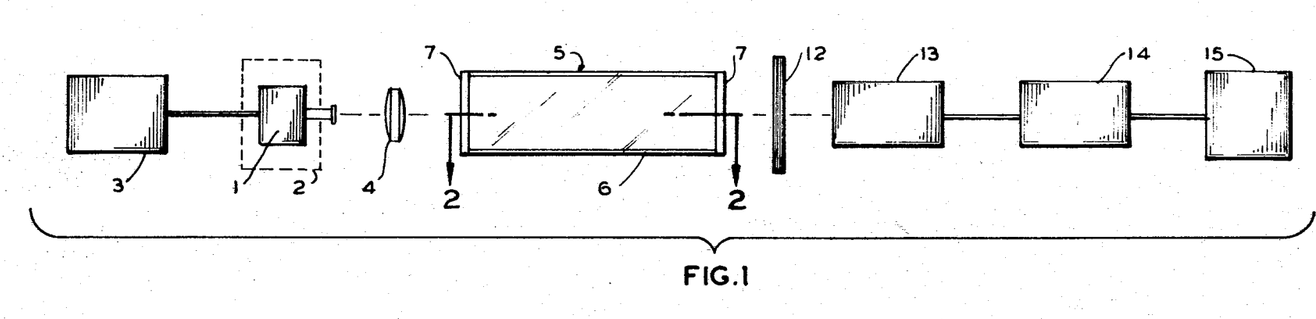
FIG. 1 is a schematic view illustrating a fluid measurement system constructed in accordance with and embodying the present invention.

Referring now in more detail and by reference characters to the drawings which illustrate practical embodiments of the present invetion, a fluid measurement system is schematically illustratetd in FIG. 1 and generally comprises a laser producing source or so-called laser 1 which may be preferably located within a cryogenic medium 2. The laser 1 is also connected to a laser power supply 3 which may be operated on D.C. voltage but in many instances will be operated under pulsed conditions.

In view of the fact that many of the lasers generate a great deal of heat, it is often necessary to maintain the laser 1 in a cryogenic medium 2. Furthermore in most applications, it is desirable to use a pulsing of the D.C. voltage to the laser in order to provide proper operation of the laser. The present invention also contemplates the use of infrared light emission, visible light emission and ultraviolet light emission laser diodes with forward-biased P-N junctions. Some of the desirable semi-conductor laser diodes which can be employed in the present invention are indium antimonide, indium antimonide arsenide represented by the formula $InSb_{(1-x)}As_x$, indium arsenide, indium gallium arsenide represented by the formula $In_{(1-x)}GaAs_x$, indium arsenide phosphide represented by the formula $InAs_{(1-x)}P$, indium phosphide, gallium arsenide, gallium arsenide phosphide represented by the formula $GaAs_{(1-x)}P_x$, silicon carbide, zinc sulfide, zinc selenide, zinc telluride, cadmium sulfide, cadmium selenide, cadmium telluride.

Other semi-conductor materials which are useful in the present invention are represented by their chemical formulas set forth below: HgS, HgSe, HgTe, $CdS_{(1-x)}Se_x$, $CdSe_{(1-x)}Te_x$, $ZnS_{(1-x)}Se_x$, $ZnSe_{(1-x)}Te$, $Zn_{(1-x)}CdS$, $Zn_{(1-x)}CdSe$, $Zn_{(1-x)}CdTe$, $Cd_{(1-x)}Hg_xS$, $Cd_{(1-x)}Hg_xSe$, and $$Cd_{(1-x)}Hg_xTe$$

The diode involves the conversion of the electrical energy into infrared visible or ultraviolet light. The light produced is coherent and has a narrow radiation band width. When gallium arsenide diodes are biased in the forward direction, they emit photons with energy in the infrared. Upon operation nearly all the injected carriers in the diode recombine and emit a photon whose energy is slightly but significantly smaller than the optically measured band gap of gallium arsenide. In diodes of this type, almost every minority carrier which is injected across the P-N junction in the process of recombining with a majority carrier emits a quantum of infrared radiation. It has been found that gallium arsenide diodes are superior in their emission properties to germanium or silicon diodes in that gallium arsenide is a direct-gas semi-conductor whereas germanium and silicon are indirect-gap semi-conductors. The addition of phosphorus to the gallium-arsenide system produces single crystals of $GaAs_{(1-x)}P_x$ and increases the band gap over that of gallium arsenide. It also increases the energy of the emitted photons and brings the radiation in many cases into the visible region of the spectrum. Since the alloy crystal can contain up to about 50% phosphorus and still have the direct-gap band structure characteristic of gallium arsenide, it is possible to make gallium arsenide phosphide diodes which will laser at relatively short wave lengths.

While lasers have been found to be the most effective light emitting media, it has also been discovered in connection with the present invention that other semi-conductor light emiting sources can also be employed with great effectiveness. It is recognized that the laser produces a coherent source of monochromatic light. However, coherency is not an absolutely critical attribution of the radiation.

Incoherent forms of radiation which are produced by semi-conductor materials may also be employed with a fair amount of effectiveness. In the case of the incoherent light source, the band width of the light beam is substantially wider than the band width of the laser beam. However, in many applications, this considerably wider band width of up to 300 angstroms may produce very effective results. For example, a gallium arsenide phosphide diode can produce a laser beam with a band width of approximately 10 angstroms at 77° K. A similar type of source used to produce incoherent light may have a band width of 300 angstroms. However if one were interested in detecting the presence of nickel sulfate-water solutions, for example, which have a very wide absorption band in the visible or near infrared, either a coherent or incoherent source of light may be effectively employed. One of the methods of producing coherent light with a semi-conductor device resides in the bombardment of the device with electrons. Generally, the semi-conductor device is provided with a P-N junction and a Fabry-Perot cavity so that light can be emitted from the cavity. In these devices, a lens is preferably employed to focus the light since it is not necessarily emitted in the form of a columniated beam.

It is not necessary to use an injection laser. A piece of semi-conductor material which does not have the P-N junction may also be employed. In this case, the semi-conductor mass is bombarded with electrons so that the atoms are raised to an elevated energy state and re-emit coherent light when the semi-conductor mass is provided with a Fabray-Perot cavity.

Another effective method of producing a coherent monochromatic light source resides in the optical pumping of a semi-conductor source. In essence, this is very similar to the electron bombardment. However in this case, radiation is employed. The radiation has photons with a higher energy level than the resulting emitting coherent radiation from the semi-conductor device. A white light source may be employed as the source of radiation for the bombardment of the semi-conductor device. Often a Zenon flash tube is used as the optical pumping source.

The laser beam is then passed through a lens 4, which is desirable for focusing in cases of concentrated solutions or long transmission paths. It is often preferable to have an adjustable lens 4 in order to compensate for the various sizes of the sample cells which may be employed to improve the limits of detection.

Figure 2:
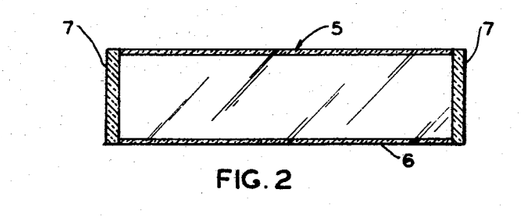
FIG. 2 is a horizontal sectional view taken along line 2—2 of FIG. 1 and showing the construction of the sample cell forming part of the fluid measurement system of FIG. 1.

The laser beam, after focusing by the lens 4, is next passed through a sample cell or so-called "sample tube" 5 which comprises an optical tube 6 having a pair of optical flats 7 on each of its transverse ends, that is the ends transverse to the direction of the laser beam. It is desirable to have optical flats 7 on each of the ends of the sample cells 5 in order to prevent the distortion of the laser beam. It is also possible to have sample cells which are connected to continuous feed systems so that a solution in the form of a fluid or gas may be continuously admitted and withdrawn from the sample cell 5.

Figure 3:
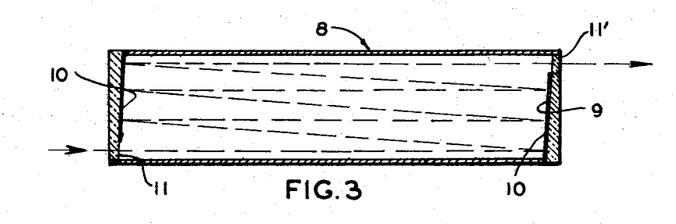
FIG. 3 is a horizontal sectional view of a modified form of sample cell similar to the view of the sample cell of FIG. 2.

FIG. 3 represents a modified form of sample cell 8 which is also provided with a pair of optical flats 9 on each of its transverse ends. The optical flats 9 are also transverse to the direction of the laser beam in the same manner as the sample cell 5. Furthermore, the optical flats 9 are provided with reflectors or reflective surfaces 10 on each of their interior surfaces in the manner as illustrated in FIG. 3. The reflective surfaces 10 may be formed of any silver coating or similar light reflecting surface which is capable of reflecting the laser beam. The reflecting surfaces 10 do not extend for the entire length of the optical flats 9 and are preferably located so that the reflecting surface 10 on the left transverse flat 9 provides a non-reflecting optical flat or transmitting area 11 at the lower end of the left optical flat 9 and a light transmitting area 11' at the upper end of the right transverse optical flat 9, in the manner as illustrated in FIG. 3. In this manner, the laser beam can be admitted through the areas 11, 11' and reflected from the reflecting surfaces 10 so that multiple reflections may occur between the two reflecting surfaces 10 in the sample tube 8. In this manner, it is possible to take advantage of a short sample tube 8 by multiple reflections of the laser beam and thereby insure sufficient absorption of the laser beam in the same manner as though a sufficiently long tube had been employed.

The portion of the laser beam which has not been absorbed by the fluid contained in the media in the sample cell 5 is then passed through an optical filter 12, which is preferably of neutral density. The filter 12 is not necessary in all applications and is designed to reduce the intensity of the laser beam if a sufficient amount of the beam has not been absorbed in the sample cell 5. The optical filter 12 is conventional and generally includes a substrate which is transparent in the wave length of the laser beam. The substrate may include one or more layers of thin films. Often, multilayer dielectric optically thin films deposited on the substrates serve as suitable optical filters. Such substances as zinc sulfide, ceric oxide, lead molybdate, lead tungstate, magnesium fluoride, lithium fluoride and aluminum fluoride are often usable in forming these optically thin films.

A radiation detector 13 is located so that the laser beam transmitted through the optical filter 12 is incident thereupon. The spectral response of the radiation detector 13 should be matched to the spectral distribution of the laser output. For example, if the laser output has a wave length of approximately 6584 angstroms, the radiation detector should be designed to sense the presence of a laser beam with such wave length. Often, a photomultiplier tube will serve as a suitable radiation detector. In many cases, a semi-conductor device may also be used as the radiation detector. This device is generally conventional and, therefore, neither illustrated nor described in detail herein.

Any suitable conventional electronic detector 14 may be connected to the radiation detector 13 for converting the signal from the radiation detector into an electrical signal capable of readout in a conventional readout device 15, the latter being electrically connected to the electronic detector 14. The readout device may be in the form of a meter such as a voltmeter or it may be in the form of a plotter such as X-Y plotter or recorder. A narrow pass-band amplifier may serve as a suitable electronic detector.

Theory of operation

A laser is generally a monochromatic source of light where all of the photons are of nearly the same wave length. The laser, of course, emits coherent light which has two particular properites. The first property is that the light is monochromatic, and the second property is that it has a spatial coherence, i.e. all of the photons are in phase. The apparatus and the method of the present invention operate on the theory that the laser is selected so that it will emit a beam with a wave length which falls at an absorption band of the particular fluid being tested. The device and the apparatus of the present invention serve two definite functions. In the first place, it is designed to detect the presence of a gas or a liquid in a media. For example, if the media contained in the sample tube 5 were a liquid, it may be desired to detect the presence of molecules of a particular compound in that media. In this case, the absorption band or absorption bands of the particular molecules of said compound would be known. A semi-conductor diode of the type previously described would be selected so that it emits a laser beam with a wave length range comparable to the wave length range of the absorption band of the molecules of the compound in the fluid. For example, if it were desired to detect the presence of nickel sulfate in water, and nickel sulfate has an absorption band at 6584 angstroms, a semi-conductor diode would be selected which emits a laser beam at 6584 angstroms. Accordingly, more of the laser beam would be absorbed at this wave length range than at any other wave length range. Both gases and liquids have a number of absorption bands. The location of these bands is, of course, characteristic of the fluid itself. If it were desired to detect the presence of a gas, one or more of the characteristic absorption bands would be determined and lasers emitting at the wave lengths of the absorption bands would be employed. It is to be noted by reference to FIGS. 5 and 6 that liquids often have rather broad absorption bands, whereas many absorption bands in gases are quite narrow. It is also to be noted that some gases may have both wide and narrow absorption bands. The half width of the laser emission is often narrower than the absorption band.

The present invention is also useful in determining the quantity of a fluid present in the media, if such fluid is known to be present. For example, if it is known that lead chromate is present in a water bath, then one would select a semi-conductor diode which emits a laser beam at the wave length of an absorption band of lead chromate. It would also be necessary to perform tests on standard solutions in order to calculate the amount of lead chromate present in the medium. For example, a test would be conducted with pure water to determine the amount of absorption in the water by determination of the amount of radiation incident upon the radiation detector 13 after passing through the pure water. The same test would be performed with a lead chromate solution of known concentration. Again when the laser beam is passed through the lead chromate solution of known concentration, it is possible to determine the amount of absorption of the laser by measurement of the amount of radiation incident upon the radiation detector 13. These two determinations will provide limits of the amount of absorption between these two limits. Accordingly, if 25% of the amount of laser radiation normally incident upon the detector with a solution of known concentration is then incident upon the radiation detector with a solution of unknown concentration, it is clear that approximately 25% of the solution is present in the medium.

It is possible to calibrate this system by plotting the signal versus the concentration of the solution according to the formula $I_\lambda = I_i e^{-a_\lambda c x}$.

where $I_i$ is the intensity of the incident radiation
$e$ is the Napierian base (a const.)
$a_\lambda$ is the absorptivity of the substance at the wave length $\lambda$ of interest
$x$ is the optical path length through the absorbing media
$c$ is the concentration of the absorbing substance
$I_\lambda$ is the intensity of the beam after it has been absorbed by an optical path length $x$.

Preferred measurement and detection apparatus

Figure 4:
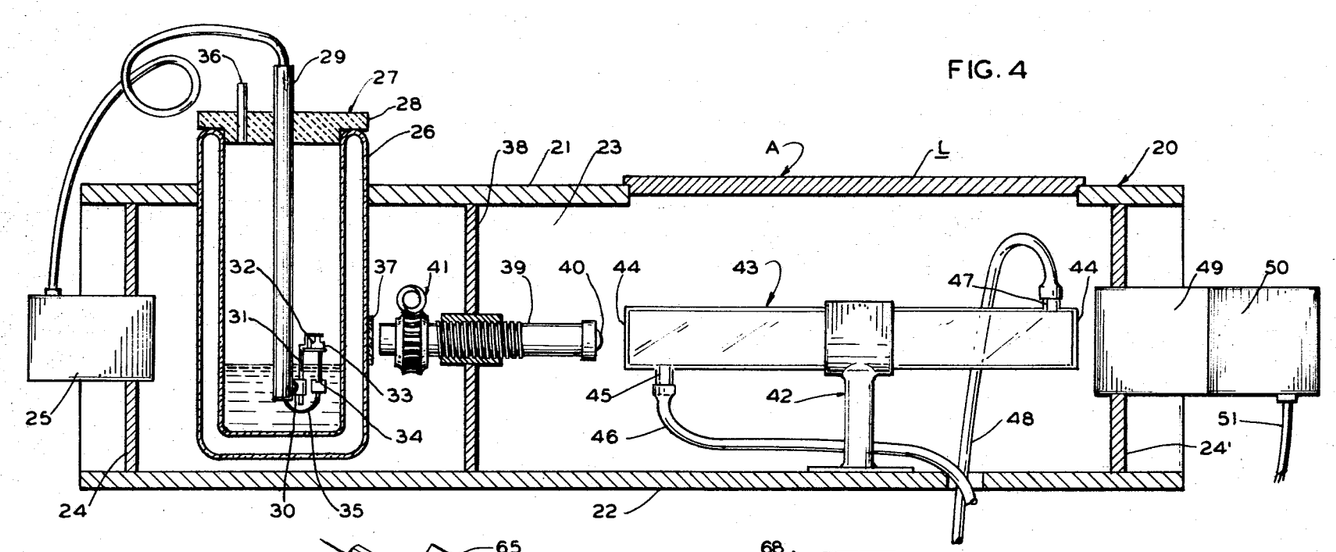
FIG. 4 is a vertical sectional view of a fluid measurement apparatus constructed in accordance with and embodying the present invention and showing a preferred mode of construction.

FIG. 4 illustrates one apparatus of the present invention and shows the details of construction thereof. FIG. 4 is a vertical sectional view of an apparatus A which is constructed in accordance with and embodies the present invention and illustrates the details of construction thereof. This apparatus A includes an outer housing 20, which is rectangular in vertical cross section and includes a top wall 21 and a bottom wall 22, connected by front and rear walls 23. Spaced interiorly of the left transverse end of the front and back walls 23 and extending transversely across the housing 20 is a left end wall 24, reference being made to FIG. 4. Also spaced interiorly of the right transverse end of the front and rear walls 23 and extending transversely thereacross is a right end wall 24'. Mounted in the end walls 24 and extending through an aperture therein into the interior of the housing 20 is a laser power supply 25, which is substantially identical to the laser power supply 3.

The top wall 21 is suitably apertured near the end wall 24 and accommodates a Dewar flask or so-called "insulated bottle" 26, which rests upon the upper surface of the bottom wall 22 in the manner as illustrated in FIG. 4. The bottle 26 is open at its upper end and is suitably provided with a heat insulating lid 27 having an extended flange 28, which rests upon the upper margin of the bottle 26. The lid 28 is centrally apertured and accommodates a hollow metal support rod 29, which terminates near the lower margin of the bottle 26. Secured to the lower end of the support rod 29 by means of stainless steel sheet metal screws 30 is an inverted L-shaped support bracket 31. A semi-conductor diode laser 32 of the type previously described is secured to the bracket 31 and retained thereon by means of a retainer plate 33. The support bracket 31 and the plate 33 are preferably made of copper or other suitable electrically and thermally conductive material. The diode 32 may be provided with the necessary resistors as desired to match the impedance of the pulser and is connected to a junction plate 34, which is in turn, connected to leads 35. These leads 35 pass through the hollow portion of the support rod 29 and are connected to the laser power supply 25. The bottle 26 is supplied with liquid nitrogen or similar cooling media to a desired level, which is slightly below the semiconductor diode 32. It has been found that if the liquid nitrogen extends to a level above the diode 32 that bubbling of the nitrogen during boiling thereof will interfere with the laser beam. The lid 27 is also provided with a vent 36 permitting the escape of the volatilized nitrogen vapors. The lid 27 may also be provided with another aperture (not shown) for adding additional liquid nitrogen into the bottle 26. The bottle 26 is also provided with a window in alignment with the diode 32, permitting transmission of the laser beam generated by the diode 32.

Extending transversely across the housing 20 is an intermediate support plate 38 and mounted in the support plate is a circular bracket 39 for retaining a suitable lens 40. The lens 40 is also conventionally provided with an adjusting mechanism 41 for shifting the lens 40 longitudinally within the housing in order to provide proper focusing of the laser beam.

Mounted on the upper surface of the bottom wall 22 is an upstanding bracket 42 for retaining a sample cell 43 in the manner as illustrated in FIG. 4. It can be seen that the sample cell 43 is transparent and is provided with a pair of optical flats 44 at each of its transverse ends. Moreover, the sample cell 43 is located in approximate horizontal alignment with the lens 40 and with the transparent plate 37 for permitting the laser beam to be transmitted through the sample cell 43. By further reference to FIG. 4, it can be seen that the sample cell 43 is removably mounted in the bracket 42 so that sample cells may be interchanged. At its left transverse end, the sample cell 43 is provided on its underside with a fluid port 45, which is connected to a flexible tube 46, the latter being, in turn, connected to a suitable source of the fluid to be admitted to the sample cell 43. At its right transverse end on the upper surface thereof, the sample cell 43 is provided with an outlet port 47, which is connected to a tube 48, the latter being discharged into a drain (not shown). By means of this construction, fluid can be admitted to the sample cell 43 and passed through the sample cell 43 in the direction of the movement of the laser beam. Accordingly, it is possible to continually admit and change the fluid content in the sample cell 43. By means of this apparatus, it is possible, thereby, to control the amount of a substance contained within a fluid in the housing.

The housing may be provided with a pivotal lid 1 providing access to the interior of the housing 20. The lid 1 is hingedly connected to the housing in the manner as illustrated in FIG. 4 and is capable of being closed to a light-tight position. In essence, the interior of the housing between the end walls 24, 24' s light-tight so that any extraneous source of light will not interfere with the operation of the apparatus A.

Suitably mounted in the right transverse end wall 25 is a radiation detector 49 which is conventional in its construction and is similar to the radiation detector 13. Secured to the radiation detector 49 is an electronic detector 50, which is also conventional in its construction and is substantially identical to the electronic detector 13. The electronic detector 50 is also conventionally provided with a pair of leads 51 for ultimate connection to a suitable readout device such as the device 15.

It can be seen that the apparatus A is suitably adapted for use in determining the amount of a component in a fluid media where the amount of the component may be continually changing. Accordingly, it is possible to monitor the content of such component in the media which is admitted to the sample cell 43. This type of construction enables the apparatus A to be used in feedback control systems. The tubes 46, 48 can be suitably connected to two points on a process stream for monitoring the amount of a component in a fluid in the process stream.

Process control system

It can be seen that the laser device of the present invention can be used in many types of spectroscopic analysis. It can also be seen that this type of apparatus is suitably used in many control processes which may or may not contain by-pass loops or feedback loops. For example, the laser source may be placed on one side of a transparent process line. The radiation detector 13 can be placed on the opposite side of the process line and the other attendant components can be connected to the radiation detector 13. In this connection, it should be understood that the process line does not have to be transparent in toto, but only a portion of the line need be transparent in order to pass the laser beam therethrough. In this manner, the electronic detector 14 would be connected to a control valve on either the upstream or downstream positions in order to change the input or output respectively into the process line.

Figure 5:
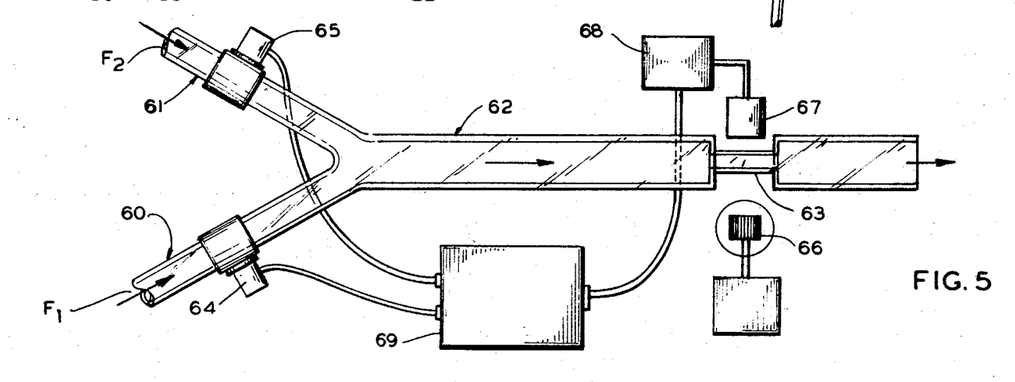
FIG. 5 is a schematic view illustrating the fluid control system of the present invention used in a feedback control system.
Figure 6:
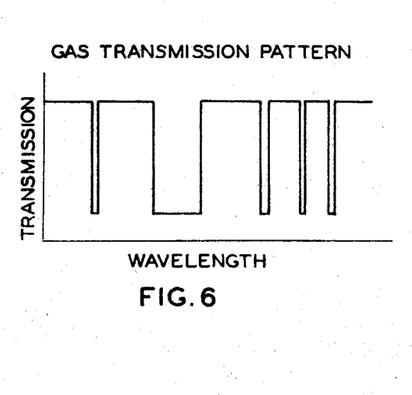
FIG. 6 is a diagrammatic view of a spectrographic transmission pattern of a typical gas showing absorption bands in the gas at various wave lengths and where the transmission of light through the gas is plotted as a function of wave length.
Figure 7:
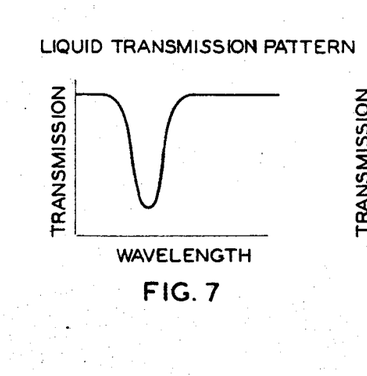
FIG. 7 is a diagrammatic view of a spectrographic transmission pattern in a liquid showing the absorption band at a certain wave length in the liquid and where the transmission of light through the gas is plotted as a function of wave length.

FIG. 5 represents a typical process control system wherein a fluid $F_1$ may be admitted to a leg 60 of a Y-shaped tube and a fluid $F_2$ may be admitted to a leg 61 of the Y-shaped tube. The two legs 60, 61 are then connected at a suitable point where the two fluids $F_1$ and $F_2$ are mixed and transmitted through a tube 62. The tube 62 may be provided with a reduced area 63 or transparent area 63 where the analysis of the two fluids $F_1$, $F_2$ may take place. Control valves 64, 65 are interposed in the legs 60, 61 respectively in the manner as illustrated in FIG. 5.

A laser source 66, substantially similar to the laser source 1 is located on one side of the reduced area 63 and a radiation detector 67 is diametrically opposed to the laser source 66 on the opposite side of the reduced area 63. The radiation detector 67 is, in turn, electrically connected to an electronic detector 68 for producing an electric signal responsive to the amount of the laser beam passing through the reduced portion 63. The amount of absorption of the laser beam in the fluid contained in the tube 62 is detected by the radiation detector 67 and the signal produced by the electronic detector 68 is directly proportional to that amount of absorption. This signal is, in turn, electrically transmitted to any conventional electronic controller 69, which is, in turn, electrically connected to each of the control valves 64, 65.

If it was desired to monitor the amount of fluid $F_1$ in the solution containing fluids $F_1$ and $F_2$, the laser producing means 66 would be designed to emit a laser beam with a wave length compatible with the absorption band of the fluid $F_1$. Thus during the monitoring operation, if it is determined that the quantity of $F_1$ is too large with respect to the total amount of fluid, a control signal would be developed from the electronic controller 69, which would, in turn, either open the valve 65 or close the valve 64. On the other hand, if the amount of fluid $F_1$ was too small with respect to the total amount of fluid passing in the tube 62, then the electronic controller 69 would close the valve 65 and open the valve 64 pursuant to the signal from the radiation detector 67 and electronic detector 68. It should be understood that this is only one of many forms of process control systems which could be used with the fluid measuring system of the present invention.

Absorptimeter

Figure 9:
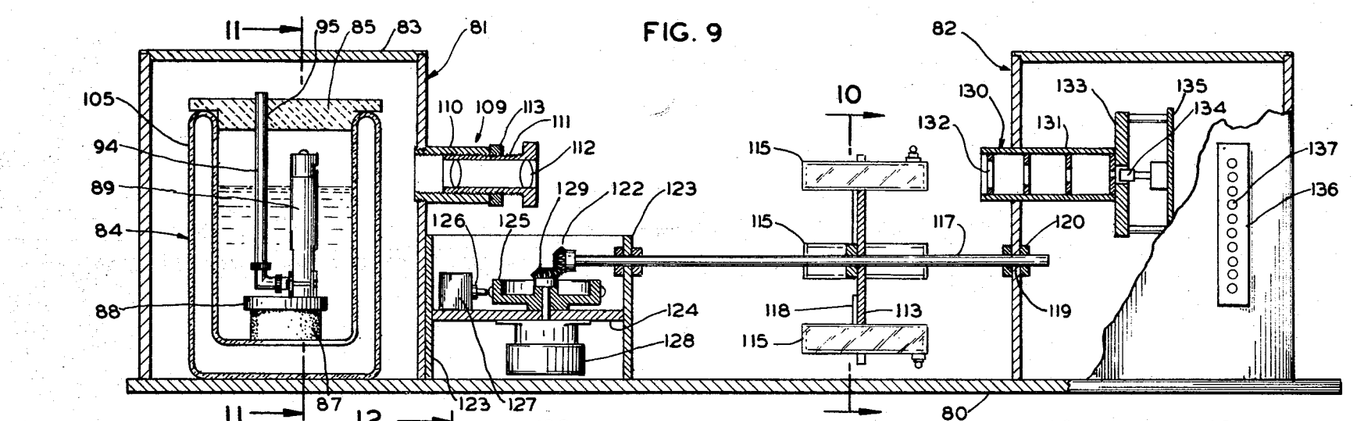
FIG. 9 is a vertical sectional view partially broken away of a modified form of fluid measurement apparatus constructed in accordance with and embodying the present invention and showing the use thereof as an absorptiometer.
Figure 10:
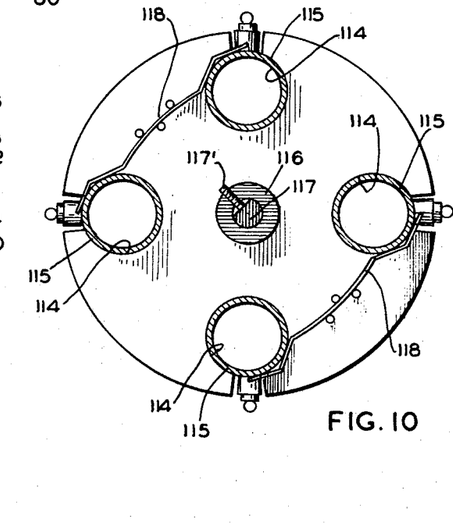
FIG. 10 is a vertical sectional view taken along line 10—10 of FIG. 9 and showing a portion of the turret forming a part of the fluid measurement system.
Figure 11:
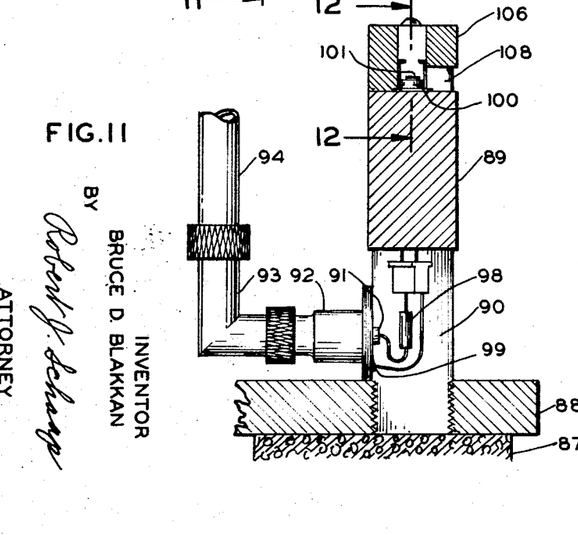
FIG. 11 is a fragmentary vertical sectional view taken along line 11—11 of FIG. 9 and showing a portion of the laser supporting system forming part of the present invention.

FIGS. 9–12 illustrate a modified form of fluid measurement system which functions as an absorptimeter. More specifically, the apparatus described herein is used in a colorimetric function and, therefore, may be considered to serve as a colorimeter. Referring to FIG. 9, B represents an absorptimeter which generally comprises a base plate 80 and mounted on the opposite ends of the base plate 80 are a pair of light-tight housings 81, 82 as illustrated in FIG. 9. The housing 81 is provided with a removable top wall 83 and accommodates a Dewar flask or insulated bottle 84, which is similar to the Dewar flask 26. The bottle 84 is open at its upper end and is suitably provided with a heat insulating lid 85 having an extending flange 86, which rests on the upper margin of the bottle 84. Disposed in the bottom of the bottle 84 is a styrofoam cushion or pad 87 and disposed on the upper surface of the pad 87 is a metallic support plate 88. The plate 88 is internally apertured to accommodate an upstanding metal support rod 89, which is provided with an enlarged recess 90 at its lower end. Secured to the side wall of the support rod 89 in alignment with the recess 90 is an insulated plug 91 having an outwardly extending nipple 92. Secured to the nipple 92 is an L-shaped pipe fitting 93 and threadedly secured to the pipe fitting 93 is an upstanding hollow metal tube 94, which accommodates electrical leads (not shown). The tube 94 extends upwardly through an aperture 95 formed in the lid 85 in the manner as illustrated in FIGS. 9 and 11.

The support rod 89 is also provided with a pair of central bores 96 for accommodating electrical leads which are in turn connected to an electrical socket, the latter being located in the recess 90 as illustrated in FIG. 11. Furthermore, one of the electrical leads is connected through a resistor 98 and the other electrical lead is grounded at 99. The lead which is connected to the resistor 98 is in turn disposed in the insulated plug 91 and is threaded through the tube 94.

Figure 12:
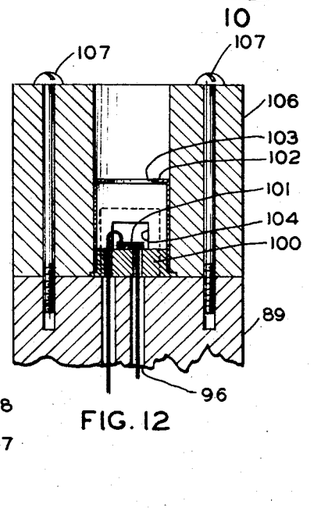
FIG. 12 is an enlarged fragmentary vertical sectional view taken along line 12—12 of FIG. 11.
Figure 13:
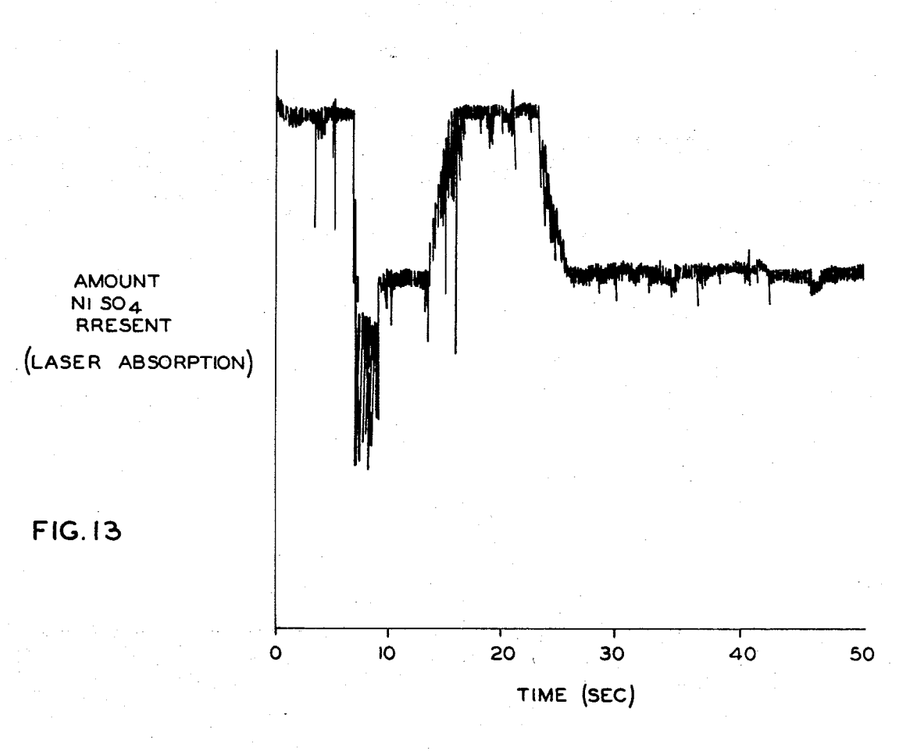
FIG. 13 is a diagrammatic view showing laser absorption as a function of time in a system where two fluids are continuously moved through a sample chamber.

Disposed upon the upper surface of the support rod 89 is a diametrally reduced support plate 100 and retained thereon is a laser diode 101. Disposed over the support plate 100 and the diode 101, is a cap 102, which has a central aperture 103 in its top wall. Furthermore, the cap 103 is provided with a window 104 in approximate horizontal alignment with a similar window 105 formed in the Dewar flask. Secured to the upper surface of the support rod 89 and holding the cap 102 securely over the support plate 100 is a cover sleeve 106, which is retained by means of machine screws 107. The cover sleeve 106 is centrally bored in order to accommodate the cap 102 in the manner as illustrated in FIG. 12. The cover sleeve 106 is similarly provided with a window 108, which is located in approximate horizontal alignment with the window 105 in the flask 84 and the window 104 in the cap 102. By reference to FIGS. 10–12, it can be seen that the support rod 89 also serves as a heat sink.

In operation, the liquid nitrogen is poured into the Dewar flask to a level which is below the cover sleeve 106. However, since the support rod 89 is formed of a metal such as copper and the cover sleeve 106 is formed of a metal such as copper, these two elements serve as a suitable heat sink for retaining the diode 101 at the same temperature as the surrounding media. Generally, it is preferred to maintain the diode at an approximate 77° K. temperature.

By maintaining a liquid level below the diode 101, the gas bubbles which normally occur no longer interfere with the operation of the diode 101 and thereby eliminate a potential source of noise.

The housing 81 is apertured to accommodate a lens assembly 109, including an outer mounting tube 110, which is secured to a wall of the housing 81. Threadedly disposed in the mounting tube 110 is a lens tube 111 having a pair of axially spaced lenses 112. A locking nut 113 is also threadedly disposed about an externally threaded portion of the lens tube 111 for locking the lens tube 111 securely in a desired position. The lens tube 111 is horizontally aligned with the window 105 and the windows 104, 108.

A rotatable turret or spindle 113 is operatively associated with the base plate 80 and is provided with four circumferentially spaced apertures 114 for accommodating sample tubes 115 in the manner as illustrated in FIGS. 9 and 10. The spindle 113 is integrally provided with a central boss 116 which is secured to a rotatable shaft 117 by means of a set screw 117′, in the manner as illustrated in FIG. 9. It can be seen that the sample tubes 115 are removably held in position by means of spring clamps 118. In this manner, it is possible to slip the sample tubes 115 out of the apertures 114 for insertion of new sample tubes. The shaft 117 is supported in an aperture 119 formed in the end wall of the housing 82 and is retained therein by means of set collars 120. At its opposite end, the shaft 117 is provided with a miter gear 122.

Also mounted on the base plate 80 is a pair of upstanding plates 123 for retaining a horizontal support plate 124. The shaft 117 is also supported in an aperture formed in one of the plates 123. Mounted on the plate 124 is a rotatable wheel 125 having protuberances which engage a limit switch 126 on a timer 127. Similarly, mounted on the plate 80 is a timing motor 128 having a miter gear 129, which meshes with the miter gear 122. By means of this construction, the motor 128 will rotate the miter gears 129, 122 and cause rotation of the shaft 117. As this occurs, the wheel 125 will also rotate until one of the protuberances contacts a limit switch 126 on the timer 127. The timer 127 is connected to the motor 128 in any conventional means by leads (not shown). The timer 127 and motor 128 may be manually operated by a switch (not shown) so that at the closing of the switch the wheel 125 will rotate for approximately 90° until one of the protuberances thereon strikes the limit switch 126. In order to again rotate the wheel 125, one would then close the switch. It is to be noted that as the wheel 125 rotates, the shaft 117 will rotate and also rotate each of the sample tubes 90°. The motor may also be provided with a conventional time delay system for automatically initiating rotation of the wheel 125 and spindle 116 after a predetermined period of time. This type of structure is conventional and is not described in further detail herein. However, it is to be noted that as the wheel 125 rotates 90°, the turret 113 will rotate 90° and hence each successive sample tube 115 will be rotated into alignment with the lens tube 111 and the laser diode 101. The sample tubes 115 are substantially identical to the previously described sample cells 5.

Mounted in the end wall of the housing 82 facing the sample tubes 115 is a receiver tube 130 having four axially spaced discs 131. Each of the discs, starting from the left, that is the end proximate to the sample tube 115 is provided with consecutively smaller central apertures 132 to prevent stray light from entering the system. Therefore, the disc 131 most proximate to the sample tube 118 has the largest aperture and the disc 131 most distal to the sample tube 115 has the smallest aperture. Mounted on the inner end of the receiving tube 130 and being located in the housing 82 is a bracket 133, which retains a radiation detector 134, the latter being electrically connected to a circuit board 135. The circuit board 135 is designed to amplify the signal from the detector 134 and transmits the signal to a readout panel 136 mounted on the exterior wall of the housing 82. The panel 136 includes a plurality of indicating lights 137, which are designed to light in succession in response to the size of the signal from the detector 134. The circuit board 135 includes conventional circuitry to perform this function. Therefore, if the signal is small, only a few lights 137 on the readout panel 136 will be energized. If the signal increases, a larger number of lights on the panel 136 will be energized. It is to be noted that inasmuch as the detector 134 is only responsive to a type of semi-conductor light source, ambient light conditions will not affect the reading of the device. Furthermore, as the spindle 113 rotates, it will successively place into alignment with the lenses 112 and the detector 134, the contents of each sample tube 115. Detection of the presence of a specific component or of the amount thereof can then be performed by the absorption method previously described.

Operation

In use, the semiconductor diode which produces the coherent radiation is selected to emit radiation within a wave length which is equivalent to the wave length of an absorption band in either the gas or liquid which is to be detected or measured. The component which is to be detected is admitted to the sample cell 5 and the laser beam passed therethrough. Inasmuch as the sample cell 5 is provided with optical flats 7, the laser beam is not distorted. As radiation from the laser is transmitted through the media, a portion of the radiation will be absorbed depending on the absorptivity of the media, the optical transmission length, and the concentration of the absorbing material. It may be necessary to impose a neutral density filter in the light beam to reduce the intensity of the radiation incident upon the detector for increasing the detector signal to noise ratio. Radiation incident on the detector will result in an electrical output to the electronics which may be read on the conventional readout device 15 for detecting the presence of a component in the sample cell 5 or for measuring the amount of the component present in the sample cell 5.

In cases where the concentration of the component contained in the media in the sample cell 5 is small, it may be desired to use a longer sample cell 5 or, in turn, to use the sample cell 8, which will permit multiple reflections of the laser beam internally in the sample cell. This, in effect, increases the effective length of the sample cell 5.

It should also be recognized that the apparatus of the present invention can suitably be used in control operations, also as previously described. In this case, the conventional readout device 15 would not be employed. The output of the electronic detector would be, in turn, connected to a suitable control valve or other control device in process controlling relationship to the process itself.

EXAMPLES

The invention is further illustrated by, but not limited to, the following examples.

Example 1

The fluid measurement system of FIG. 4 was employed to measure the amount of nickel sulfate present in a solution contained in a samule tube. A sample tube, similar to the tube illustrated in FIG. 4, was employed and was provided with inlet and outlet ports. The outlet port was connected by suitable tubing to a drain and the inlet port was connected to a T-shaped three-way fitting. The fitting was, in turn, connected to a one liter bottle of a nickel sulfate solution having a stopcock valve at the lower end thereof. The other port of the T-shaped fitting was connected to a source of distilled water, which was also provided with a stopcock valve. The nickel sulfate solution contained approximately 95 parts of nickel sulfate per million parts of water.

A gallium arsenide phosphide diode was immersed in a liquid nitrogen bath and the leads of the diode were connected to a Spencer-Kennedy 503A fast-rise pulse generator. The liquid nitrogen Dewar had a window arranged to pass radiation out of the Dewar and through the same tube.

On the opposite end of the sample tube, an RCA photomultiplier fuse No. 7102 was used as the radiation detector. This was, in turn, electrically connected to to a Hewlett-Packard 302A wave analyzer. The wave analyzer was, in turn, connected to a Moseley X-Y chart recorder No. 7030A. The liquid nitrogen temperature was 77° K. The laser was also pulsed with an 18 amp 50 monosecond current pulse. The peak radiative power output of the laser was about 0.2 watt.

The coherent radiation from the laser was emitted at approximately 6584 angstroms. This light was passed through the sample tube which alternately contained a solution of water and nickel sulfate. During the conduction of the test, distilled water was first admitted to the sample tube by opening the stop cock to the distilled water bottle. Thereafter, the stop cock to the distilled water bottle was closed and the stop cock to the bottle containing the nickel sulfate solution was open. Nickel sulfate was admitted to the sample tube in such manner to completely remove all of the distilled water. Thereafter, distilled water was again admitted to the sample tube by the proper opening and closing of the stop-cocks and again the nickel sulfate solution was admitted to the sample tube with a continuing removal of the distilled water. The output from the X-Y recorder is plotted in FIG. 8 and discloses the rapid response of the fluid measurement system.

Figure 8:
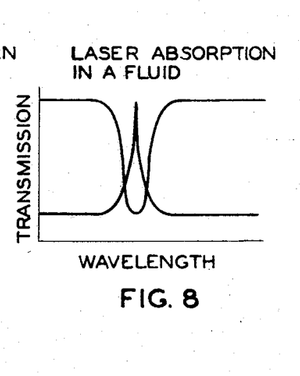
FIG. 8 is a diagrammatic view showing the absorption of a laser in a particular fluid where the laser has a wave length to match the absorption band of the particular fluid.

By further reference to FIG. 8, it can be seen that the distilled water level was substantially reduced to a nickel sulfate solution containing 97 parts per million in approximately 3 seconds. A similar amount of time was required for the rise from the 97 parts per million of sulfate to pure distilled water. Furthermore, it can be seen that this system is completely consistent from the alternate conduction of the test from distilled water to the nickel sulfate solution. Each of the distilled water and nickel sulfate solutions were admitted to the sample tube at a rate of approximately ⅙ liter per second. It was also found in connection with this test that the system of the present invention was capable of detecting nickel sulfate down to 5 parts per million of solution.

Example 2

Example 1 was repeated and all of the operating parameters were the same as in Example 1 except for the light emitting source. The laser diode was removed and substituted by a gallium arsenide diode with a P-N junction. The laser was pulsed so that incoherent light was emitted from the face of the P material. Furthermore, no cryogenic medium was employed. The diode was pulsed with D.C. current at the rate of 100 pulses per second with a size of approximately 20 amps. The light had a spectral half width of approximately 300 angstroms. It was found in connection with the experiment that nearly the same degree of sensitivity in a nickel sulfate solution was found to exist, as when the laser was employed in Example 1.

It should be understood that changes and modifications in the form, construction, arrangement and combination of parts may be made and substituted for those herein shown without departing from the nature and principle of my invention.

Having thus described my invention, what I desire to claim and secure by Letters Patent is:

1. An apparatus for measuring the amount of a fluid present in a medium, said apparatus comprising a sample chamber for containing a quantity of said medium, radiation producing means generating monochromatic coherent radiation of controlled spectral distribution and capable of being rapidly modulated from a semiconductor light emitting source, said radiation having a spectral distribution with an emissivity compatible with a principal absorption band of the fluid in said medium, said radiation producing means being located to pass the radiation through said medium, a pair of optical members on opposed ends of said sample chamber, said optical members having radiation reflecting elements on a portion of their surfaces and being transversely disposed with respect to the radiation entering said sample chamber to cause multiple reflections of the radiation in said sample chamber, said member being slightly angularly located with respect to a central axis of said chamber and having optical flats enabling the introduction and release of radiation from said chamber, and analyzing means on the opposite side of said chamber for measuring the extent of absorption of the radiation passing through said medium.

2. The apparatus of claim 1 wherein the absence of any absorption incidates the absence of the fluid in the medium.

3. An apparatus for measuring the amount of a fluid present in a medium, said apparatus comprising a sample chamber for containing a quantity of said fluid, radiation producing means generating monochromatic coherent radiation of controlled spectral distribution and capable of being rapidly modulated from a semiconductor light emitting source, said radiation having a spectral distribution with an emissivity compatible with a principal absorption band of the fluid in said medium, said radiation producing means being located to pass the radiation through said medium and a radiation detector on the opposite side of said chamber and having a spectral response matched to the spectral distribution of the output of the radiation producing means for detecting the extent of absorption of the radiation passing through said medium, and a receiver tube operatively associated with said analyzing means to reduce stray radiation from entering said analyzing means, said receiver tube having at least four axially spaced discs, each of said discs having aligned apertures with the geometric centerlines of said apertures on a coincident axis, the disc being most proximate said sample chamber having a larger aperture than the remaining discs and each of the remaining discs having consecutively smaller apertures.

References Cited

UNITED STATES PATENTS

| | | | |
|---|---|---|---|
| 2,212,211 | 8/1940 | Pfund | 250—43.5 |
| 2,350,001 | 5/1944 | Van Den Akker | 250—218 |
| 2,654,845 | 10/1953 | Presenz | 250—218 |
| 3,047,124 | 7/1962 | Wexler | 88—14 |
| 3,284,722 | 11/1966 | Gray | 331—94.5 |
| 3,316,410 | 4/1967 | Meili et al. | 250—218 |
| 3,319,512 | 5/1967 | Isrelli | 250—218 |
| 3,376,854 | 4/1968 | Kamola | 250—218 |
| 1,764,368 | 6/1930 | Thomas | 250—239 |
| 2,262,573 | 11/1941 | Bender | 356—181 |
| 3,245,002 | 4/1966 | Hall | 256—217 |

OTHER REFERENCES

"Ruby Optical Maser as a Raman Source," by Porto and Wood, Journal of the Optical Society of America, vol. 52, No. 3, March 1962, p. 251.

ARCHIE R. BORCHELT, Primary Examiner

M. ABRAMSON, Assistant Examiner

U.S. Cl. X.R.

356—180, 246